April 27, 1965  S. COUVREUR ETAL  3,180,825
PROCESS FOR THE TREATMENT OF FLUIDS
Filed May 25, 1962
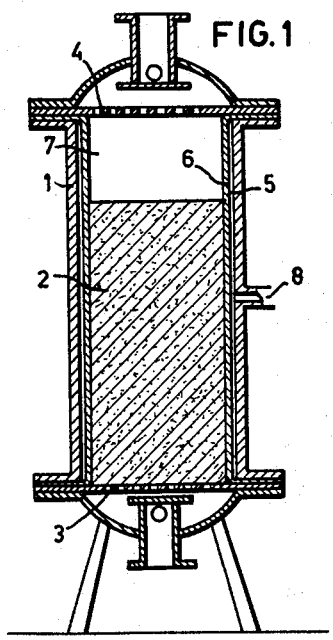
FIG.1
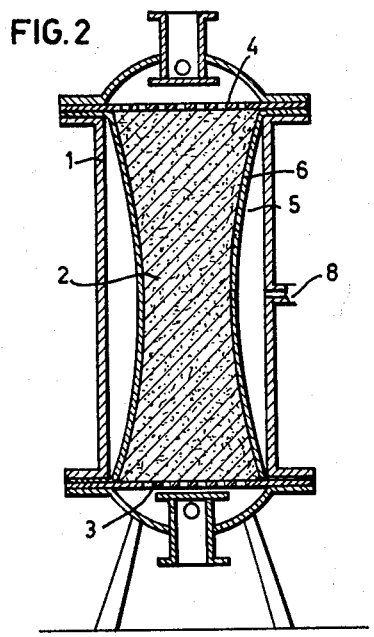
FIG.2
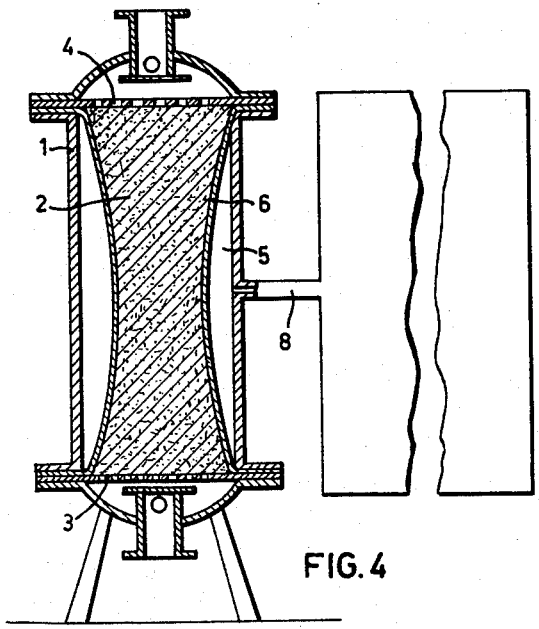
FIG.4
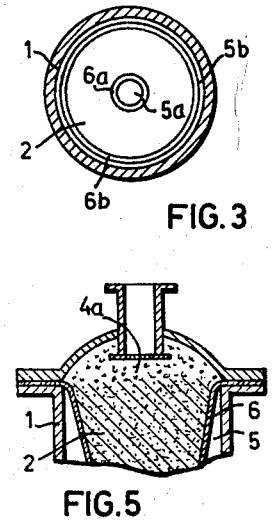
FIG.3
FIG.5

United States Patent Office 3,180,825
Patented Apr. 27, 1965

3,180,825
PROCESS FOR THE TREATMENT OF FLUIDS
Silvère Couvreur and Paul Baldwin, Brussels, Belgium, assignors to I.A.C. International Analyzer Company, Luxembourg, Luxembourg, a company of Luxembourg
Filed May 25, 1962, Ser. No. 197,705
Claims priority, application Belgium, May 29, 1961, 481,264, Patent 604,339
4 Claims. (Cl. 210—30)

The invention relates to a device and a process for the treatment, particularly the filtration, dehardening, demineralization, deionization, decoloring and purification of fluids and optional regeneration of the purification agents used for this purpose according to which process a "fluid" flows through a filtration bed which is formed by a mass of loose grained material. The term "fluid" is understood to include both liquids and gases or mixtures of both.

Liquids, such as water, are usually caused to flow in a downward direction through the bed, since an upwardly directed flow of liquid would disrupt the bed and form channels through which the liquid would flow without contacting the granules of material. Various devices which have been heretofore suggested to obtain an upward filtration have produced relatively unsatisfactory results.

Filtration in a downward direction, however, has various drawbacks. In filters which mechanically separate solid particles from the influent, the solid particles are retained in the first place by the upper layer of the bed. As a result this layer becomes a dense coherent layer, while the filtration mass below it is practically still entirely clean.

In filters functioning with a physical-chemical action, such as water dehardeners, ion exchangers, decoloring masses, and so on, chemical reactions and adsorption phenomena occur during filtration and most of these reactions are reversible. However these reactions depend on equilibrium conditions.

When for example, the liquid contains many ions which are to be exchanged for ions contained in the granular ion exchanger, such as Ca-ions in the water which is to be dehardened for Na-ion in the exchanger, the exchange will take place to a strong degree, but nevertheless not completely, because the Ca-ions taken up by the ion exchanger and the Na-ions delivered to the liquid inhibit complete exchange by reaching a partial equilibrium.

The process will proceed more completely, if the liquid thereupon is contacted with an ion exchanger or with a part of an ion exchanger which has not taken up many Ca-ions from the liquid. In practice this means that the ion exchange filter takes up more Ca-ions in the upper layers where the water enters than in the lower layers, and that for this reason the dehardening of the water proceeds more completely there. Consequently, the water is substantially dehardened in the upper layers and thereafter comes into contact with the remainder of the ion exchanger which contains only a few Ca-ions, so that the calcium ions in the water which have not combined in the higher layers, because those are charged already too strongly with Ca-ions, are exchanged in the lower layers for sodium ions.

Heretofore an ion exchanger bed which was no longer capable of a good Ca-removal from the water, has been regenerated with an NaCl-solution which is also passed in a downward direction through an ion exchanger.

In such an arrangement, the salt solution first contacts the layer which is strongly charged with Ca-ions, and does not remove these ions from the bed, but washes them into the bed. Thereafter the salt solution comes into contact with the least charged layers of the exchanger in the bottom of the bed. This process is fundamentally incorrect. One should filtrate in reversed direction. In this manner, a better regeneration yield can be achieved and a slighter leakage of the undesired ions into the filtrate would be obtained.

In a process of urging a liquid of higher specific gravity from below into the bed, in which there is a liquid of lower specific gravity, one further has the advantage that this heavier liquid displaces the lighter liquid without being mixed therewith, when the passing takes place very slowly, since the lighter liquid floats on the heavier liquid. If, however, the heavier liquid is introduced from above, mixing of the two liquids would irrevocably take place during passage of the heavier liquid through the bed which produces undesired results.

Thus when the heavy regeneration liquid is introduced into the bottom of the bed, a better regeneration yield is obtained.

Consequently, it is desirable in many cases to pass a liquid through a bed of loose grained material in an upward direction, in the above-given case the liquid may be either the regeneration liquid or the liquid to be purified. In the case where the regeneration liquid is passed upwardly through the bed, the liquid to be purified is passed downwardly through the bed whereas, in the case where the regeneration liquid is passed in a downward direction through the bed, the liquid to be purified will be passed upwardly through this bed. Consequently, the liquid to be purified and the regeneration liquid will flow in countercurrent through the loose grained material. The drawbacks which are inherent in the passing of liquid in upward direction have been pointed out hereinabove.

It is an object of the present invention to remove these drawbacks. For that purpose according to the invention the bed of loose grained material is subjected during the process to a controllable mainly sideways exerted pressure, owing to which, if desired, the entire bed can be enclosed in one space which is filled up entirely by the bed. This should be the case, e.g. in the phase in which the liquid is passed in upward direction through the bed because then the granules of the material of which the bed is composed are not allowed to be displaced with respect to each other. Under these circumstances no disruptions and channels can be formed in the bed. In this arrangement the bed is surrounded by pervious upper and lower walls, through which the liquid can flow, and an impervious sidewall or walls.

According to the invention the treatment and/or the regeneration is carried out in a bed which can undergo a volume change.

According to the invention the wall or walls enclosing the bed are composed of resilient, deformable material, so that they are displaceable by external pressure exerted thereon and this pressure, consequently, can be transferred to the bed.

In order to avoid a locally excessive expansion of the resilient walls, it is efficient to arrange one or more coarse meshed fabrics in horizontal planes in the bed forming the filtration medium which fabrics limit expansion and ensure also a uniform distribution of the fluid. These fabrics may have coarse meshes of 10–20 cm. and may be provided with a smooth edge at the outside. They may be suspended from or attached to the upper wall.

In this manner it is not only ensured that the bed, if necessary, fills the entire space in which it is contained, but—also that in general its contents can increase and/or decrease within prescribed limits. Without restricting the process hereto, increase may be necessary when the ion exchangers or decoloring resins swell during the process owing to which the granules may cohere or be damaged with all the disadvantages inherent thereto.

Occasionally, the space above the bed was not sufficient to permit such swelling during the charging of an anion exchanger as for example during the demineralization of a sugar juice, since the bed could not completely expand upwards. Thus, the possibility to admit a lateral expansion according to the invention offers a relief by which excessive pressure losses during the filtration and damage of the granules of the expensive anion exchanger are prevented.

The possibility of a lateral compression of the bed according to the invention furthermore can be utilized to provide a slight expansion space above the bed. Such expansion space is indispensable to enable rinsings of the bed in an upward direction. Rinsing upwards is substantially always necessary for mechanically removing separated impurities from the bed or for loosening the granules from agglomerated masses in the bed. These phenomena occur substantially always after a shorter or a longer time. Especially separation of colloidal substances from the liquid to be purified give rise to difficulties. According to the invention is is possible to decrease the expansion space by compressing the mass before rinsing upwardly and to loosen the granules in this manner.

It is possible to reduce the pressure loss during the charging of the bed with solid substances which have been separated from the liquid to be purified by reduction of the pressure on the resilient walls, so that the bed can expand somewhat perpendicularly to the direction of flow of the liquid.

The external pressure which is exerted on the flexible walls, according to the invention can be effected both hydraulically or pneumatically. With pneumatic operation, the pressure of the gas on the flexible walls is controlled in known manner by means of pressure meters and regulation is effected by means of reduction valves. With hydraulic operation, use can be made of an open reservoir filled with the pressure liquid, which reservoir is arranged at an efficient height in respect of the filter. In order to exert the correct pressure, an efficient automated sequence can be effected according to a predetermined program and/or controlled by the pressure in the filter.

Many modifications of the arrangement of the filter which is used according to the invention are possible. In principle each wall enclosing the space in which loose grained material (e.g. the ion exchanger bed) is enclosed can be displaced entirely or partially by a pressure exerted or partially by a pressure exerted on it from outside. When this wall is also to be permeated by the liquid, the construction thereof is less simple.

The change of the space in which the loose grained material is contained, can be effected entirely by expansion or compression of spaces which are internally provided in the chamber containing the ion exchanging bed and the expansion space. These may be flexible tubes, bags or other elements.

However this may be the entire expansion space, the space above the bed can be made to disappear by the exertion of pressure. However, care should also be taken that this pressure does not become such that the granules of which the bed is composed are damaged.

The invention will be further described in conjunction with the embodiments given by way of example in the attached drawing, wherein:

FIGURE 1 is a side elevational view in section of a filter according to the invention with the bed compartment expanded;

FIGURE 2 is a view of the filter of FIG. 1 with the bed compartment compressed;

FIGURE 3 is a cross-sectional view of a further embodiment of the filter;

FIGURE 4 shows the filter of FIG. 1 with a pressure device; and

FIGURE 5 shows in sectional view a modification of the filter of FIG. 1.

The filter comprises a rigid casing 1 containing a flexible casing 6. The filtration bed 2 is contained in the casing 6. Two walls 3 and 4 are supported on casing 1 and bound the casing 6 to define therewith a compartment for the containment of the material of the filtration bed 2. The walls 3, 4 are pervious such that the liquid is capable of passing through the filter without great pressure loss while the granules of the bed 2 are retained in the casing 6.

In the embodiment in FIGS. 1, 2, 4 and 5 the flexible casing 6 is constituted of a resilient member with a single flexible wall such that a single variable volume chamber 5 is provided. In FIG. 3 the casing is constituted of an inner flexible wall 6a and an outer flexible wall 6b which respectively define inner chamber 5a and outer chamber 5b of variable volumes.

The walls of the casing 6 are in contact with the filtration bed and are resilient such that when the chamber 5 is expanded and the casing 6 is compressed, the granules of the bed 2 are compressed without damage as long as the applied force is properly selected in relation to the pressure prevailing in the fluid casing.

The pervious wall 3 constitutes the support of the bed 2 in the casing 6, while the pervious wall 4 is located at a distance above the bed 2, so that in FIGURE 1 the free space 7 is sufficiently large to permit good expansion of the filtration bed 2. The volume of the chamber 5 may be increased, however, when the casing 6 is shrunk, such that this free space 7 disappears entirely (FIGURES 2 and 4).

In FIGURES 1 to 4 the pervious wall 4 consists of a perforated sheet, the openings of which retain the granules of the bed. In order to prevent clogging of the openings, the pervious wall 4a in FIGURE 5 is constituted by a layer of coarse granules with a lower specific gravity than that of the granules of the filtration bed so that there is always automatically by flotation a compact layer of these granules above the filtration bed 2 which layer offers a small resistance to the liquid flowing therethrough.

In FIGS. 1, 2, 4 and 5 the outer wall of casing 6 is formed by a flexible member, such as rubber or other resilient or plastic material, etc. which forms with the wall of the filter casing 1, the closed chamber 5 which by means of a tube 8 is in communication with a pressure device constituted by a reservoir filled with a fluid under controllable pressure.

The volume of the chamber 5 can be varied by changing the pressure of the fluid in the chamber. This volume can also be varied while maintaining constant pressure in the chamber 5 by changing the pressure in the bed itself.

FIGURE 4 represents a filter by means of which such a control is possible. Herein the chamber 5 of variable volume is connected by means of tube 8 with a reservoir in which the pressure is constant and higher than that in the expansion space 7 so that whatever the volume of the chamber may be the pressure prevailing therein is substantially constant.

In cases wherein a complete compression of the filtration bed such that there is no expansion room anymore, is not necessary because it is only desired to compensate excessive swelling or shrinkage of the filtration bed, the pervious wall 4 may be omitted.

The following examples are illustrative of the treatment process according to the invention:

Example 1

DEHARDENING OF BRUSSELS TAP WATER

Water of the following composition is to be dehardened.

French hardness:
  Total _____ 37°
  Temporary _____ 26°

For this purpose a cylindrical filter of the type shown in FIG. 1 with the following dimensions is used:

Diameter _____millimeters__ 695
Height between the supporting plates_____do____ 2000

The distribution of the water by the supporting sheets is ensured by small holes of 4 millimeters which are covered by means of small flat plastic plates at a distance of 0.2 millimeters from the supporting sheet.

These distributors allow the water to pass, but not the ion exchange resin.

As a cation exchanger Imac C-12 is used with the following sieving analysis.

Granular size:
  >1.2 millimeters _____  1-2
  0.8-1.2 millimeters _____  3-15
  0.5-0.8 millimeters _____ 30-50
  0.3-0.5 millimeters _____ 30-50
  <0.3 millimeters _____ 5-10

After regeneration the thickness of the layer is 1100 millimeters and consequently has an expansion height of 900 millimeters.

Consequently the volume of the bed is 420 liters.

The water to be purified is passed through the bed in downward direction at a speed of 10-15 meters/hour. As soon as the action of the bed is no longer sufficient, regeneration is carried out.

The bed is rinsed with tap water for 5 minutes at a speed of 7 to 8 meters/hour. During this process the bed is in expansion.

Now the rubber wall of the flexible casing is compressed such that the entire expansion space is filled; for this purpose water under pressure is supplied in the variable volume chamber. Thereupon the regeneration liquid can be passed through the bed in upward direction.

This regeneration liquid consists of a solution of 35 grams of NaCl in 400 liters of water.

Immediately thereafter a washing with tap water is effected by passing the tap water with great speed also from below upwards with a speed of about 20 meters/hour. Total amount of rinsing water: 2000 liters.

The casing is now expanded by emptying the variable volume chamber of water and the filter is rinsed again and thereupon is ready for a new purification phase of 61 cubic meters. Only 2500 liters of water have been used for the entire regeneration and washing process.

It has been found that the dehardened water contains less calcium than water which has been treated in the usual manner wherein the regeneration agent and the water are passed downwardly although in the latter case 2.5 times more salt is used.

Example 2

DEIONIZATION OF BEET SUGAR JUICE

The deionization of purified beet sugar juice is carried out by passing the juice from above downward over the OH exchanger, the bed of which is given the opportunity to expand because in the beginning of this purification phase the variable volume chamber between the fixed wall of the casing and the flexible rubber wall of the flexible casing is contracted.

This is necessary because the strongly alkaline anion exchange resin swells during charging.

By this measure damage of the granules substantially fails to occur.

Example 3

THE PREPARATION OF H WATER FROM BRUSSELS TAP WATER

The water has the following composition.

French hardness:
  Total _____ 37°
  Temporary _____ 26° of which 90% are Ca-salts and 10% are Na-salts.

The same apparatus as in Example 1 is used. The volume of the bed is 510 liters. After regeneration the thickness of the layer is about 1.4 meters, the expansion height 0.7 meter.

The water to be purified is passed downward through the bed with a speed of 10 to 15 meters/hour. As soon as the action of the bed is no longer sufficient, regeneration is effected.

For this purpose the bed is rinsed with tap water (5 minutes) with a speed of 7 to 8 meters/hour. During this process the flexible casing and the bed are in expansion.

Next, the rubber wall of the flexible casing is compressed so that the entire expansion space is filled; for this purpose water under pressure is admitted to the variable volume chamber.

Then the regeneration liquid is passed upwardly through the bed.

The regeneration liquid consists of 78 kilograms of 30% hydrochloric acid, containing consequently 23.4 kilograms of HCl.

The hydrochloric acid is diluted with water to 390 litres of 6% concentration. The speed through the bed is about 2.5 meters/hour.

Immediately thereafter the bed is rinsed with 2500 liters of tap water passed upwardly through the bed with great speed (about 10 meters/hour).

The flexible casing is allowed to expand by evacuating the pressure liquid from the variable volume chamber and the filter is rinsed again and thereupon is ready for a new purification phase of 71 cubic centimeters. Only 3000 liters water were necessary for the entire regeneration and washing process.

It has been found that the purified water contains less calcium and magnesium than water which has been treated in the usual way wherein the regeneration agent and water are passed downwardly although in the latter case about 3 times more hydrochloric acid is used.

What we claim is:

1. A method of treating liquid in a bed of loose grained material contained in a flexible casing of variable volume, the method comprising the successive steps of treating the liquid and regenerating the bed, both within the casing containing the bed and wherein the liquid to be treated and a regenerating liquid are alternately passed in opposite directions through the casing and the bed such that one of the liquids is passed upwardly through the bed, whereas the other of the liquids is passed downwardly through the bed, expanding the casing so that the bed only occupies a portion of the casing when a liquid flows downward through the bed, and shrinking the casing to the volume of the bed to tightly enclose the latter when the liquid flows upward through the bed.

2. A method as claimed in claim 1 wherein the step of treating of the liquid comprises passing the liquid to be treated downwardly through the flexible casing while the step of regenerating comprises passing the regenerating liquid upwardly through the flexible casing from a location below the compartment casing.

3. A process as claimed in claim 1 wherein the loose grained material is selected from the group consisting of iron-exchange resins, and decoloring resins.

4. A process as claimed in claim 2 comprising the steps of rinsing the bed prior to regeneration and washing the bed subsequent to regeneration, the liquid for washing flowing in the same direction through the bed as the liquid in the regenerating step while the liquid for rinsing flows in the same direction through the bed as the liquid to be treated, whereby the flexible casing is expanded during the rinsing step and is shrunk during the washing step.

References Cited by the Examiner
UNITED STATES PATENTS

| | | | |
|---|---|---|---|
| 2,855,364 | 10/58 | Roberts | 210—275 |
| 2,988,222 | 6/61 | Hogdahl | 210—350 |
| 3,017,996 | 1/62 | Riley | 210—351 |

MORRIS O. WOLK, *Primary Examiner*.